United States Patent [19]

Cullis et al.

[11] 4,302,418
[45] Nov. 24, 1981

[54] PROCESS FOR SURFACE FINISHING INSOLUBLE PLASTICS

[75] Inventors: Herbert M. Cullis, Silver Spring; Frederick Klaiber, Laurel, both of Md.

[73] Assignee: Baxter Travenol Laboratories, Inc., Deerfield, Ill.

[21] Appl. No.: 110,175

[22] Filed: Jan. 7, 1980

Related U.S. Application Data

[63] Continuation of Ser. No. 909,548, May 25, 1978, abandoned.

[51] Int. Cl.³ .............................................. B29C 25/00
[52] U.S. Cl. ................................... 264/341; 427/335; 427/444
[58] Field of Search .................. 264/341; 427/335, 444

[56] References Cited

U.S. PATENT DOCUMENTS

| | | | |
|---|---|---|---|
| 2,294,479 | 9/1942 | Peter | 427/335 |
| 3,020,661 | 2/1962 | Miller | 264/341 |
| 3,684,553 | 8/1972 | Van Dyk | 427/444 |
| 3,807,054 | 4/1974 | Joseph | 264/341 |
| 3,936,584 | 2/1976 | Patton | 427/335 |

*Primary Examiner*—Sam Silverberg
*Attorney, Agent, or Firm*—Robert A. Benziger; Raymond M. Mehler; Paul C. Flattery

[57] ABSTRACT

A fluid medium is used in a process for polishing all surfaces of plastic components made of a material which is insoluble or inert within that fluid medium unless subjected to a temperature at which the insoluble plastic would deform. The process, which is particularly suitable for polishing the internal surfaces of tubing components for medical equipment, includes applying a vaporized solvent at an elevated pressure to liquify or melt the insoluble plastic component surfaces without deforming the component, followed by solidifying or freezing the surfaces by removing the component from the presence of the vapors.

12 Claims, 1 Drawing Figure

U.S. Patent  Nov. 24, 1981  4,302,418
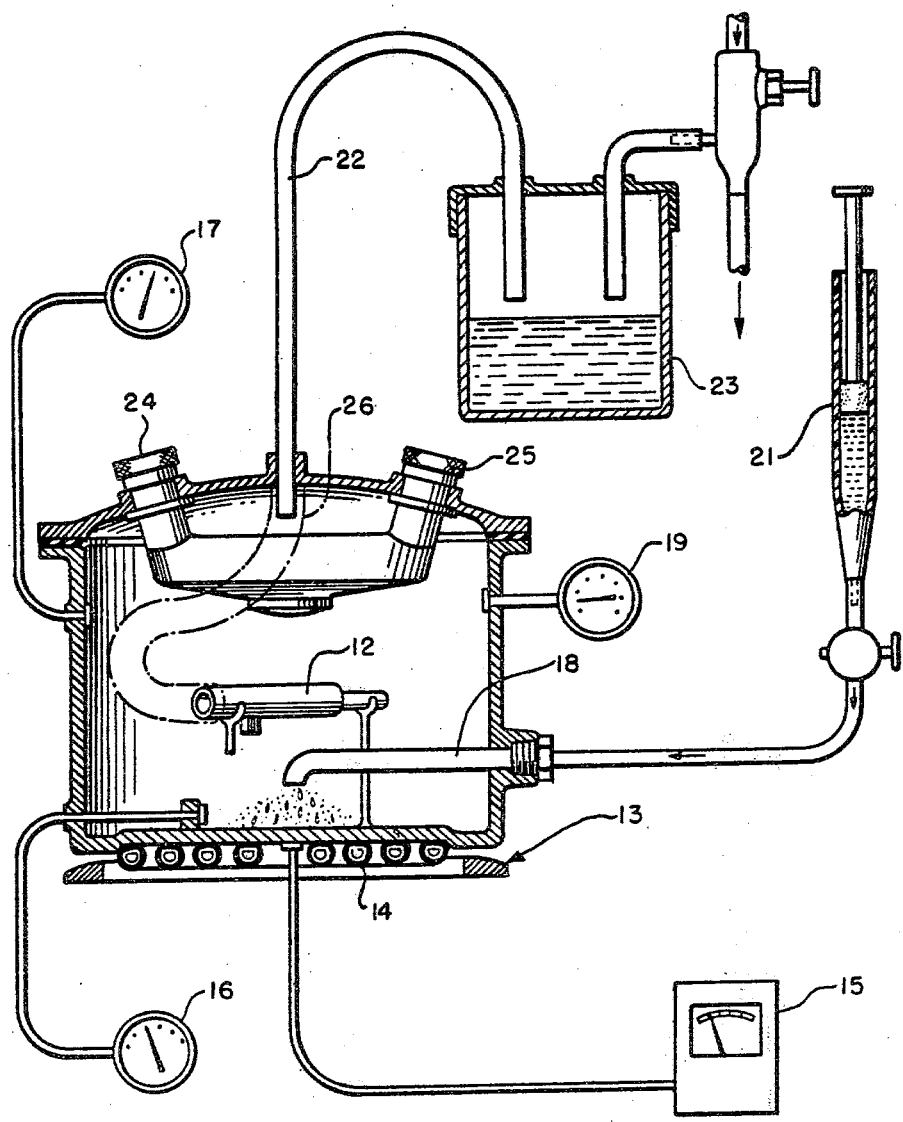

PROCESS FOR SURFACE FINISHING INSOLUBLE PLASTICS

This is a continuation of application Ser. No. 909,548; filed May 25, 1978, now abandoned.

BACKGROUND AND DESCRIPTION OF THE INVENTION

The present invention relates generally to a process for finishing the surfaces of plastics, being particularly suitable for surface finishing or polishing plastic components having shapes that are difficult to treat, such as those of small tubes and those including internal curves. In an especially preferred application, generally tubular components of medical equipment such as blood processing systems are polished to prevent hemolysis of blood when flowing therethrough, such components advantageously being made of inert or insoluble plastics.

Processes for finishing generally soluble plastics with solvent vapors are known. Representative of such known processes is Van Dyk U.S. Pat. No. 3,684,553, which discusses various surface treatments of thermoplastic polymer articles with a solvent for the thermoplastic polymer. These processes take advantage of the physical properties of the polymer, including its ability to be softened but not deformed by moderate heat and its ability to be readily dissolved by a solvent, which physical properties will allow the surface thermoplastic polymer to soften, flow and thereafter cool to reharden the surface of the article to an improved smoothness developed when surface defects on the article were generally liquified.

In proceeding in accordance with such known processes, the plastic article being treated is made of a material that is readily solventized by the solvent being used to treat the article. Certain plastic articles, for example medical equipment components that come into contact with body fluids such as blood and the like to be used in treating people, are most desirably made of insoluble and substantially inert polymers which are especially resistant to chemical breakdown and deterioration in general which would result in the transfer of polymer or polymer constituents into the body fluid contacted thereby or flowing therethrough during use of the medical equipment.

Heretofore, these highly desirable types of insoluble plastic materials could not be successfully used in manufacturing component parts that are particularly small or have difficult to reach surfaces making them extremely difficult, if not impossible, to be mechanically polished to the degree necessary for satisfactory elimination of surface defects, the minimization or elimination of such surface defects being particularly important for component parts that contact body fluids, especially when the body fluids flow through or otherwise impinge upon a surface having irregularity defects. One particularly difficult problem arises in attempting to take advantage of the beneficial medical attributes of the very insoluble inert plastic materials such as polymethylpentene and polypropylene by using these materials to make component parts, particularly the tubular and the small irregularly shaped component parts within blood processing systems, which use is severely hampered by the polishing barriers that were heretofore encountered in attempting to remove surface irregularities from inert components of this type, most critically those surface irregularities that can often lead to hemolysis of blood flowing through or impinging upon such component parts.

By proceeding in accordance with the process of the present invention, it is possible to treat component parts made of insoluble or inert plastics through the action of a fluid medium thereon, which fluid medium is brought into contact with remote areas of the component part to form surface finishes that are extremely smooth and free from minor variations such as machining marks, defects developed during molding procedures, handling damage, and damage from secondary operations such as sprue removal. These operations can be carried out on a large-scale commercial basis without requiring intricate hand polishing of individual component parts, the process of this invention making it possible to treat an insoluble plastic component part with a fluid medium which would not otherwise solubilize the surface of the plastic part without subjecting that part to a temperature at which the insoluble plastic component part would deform.

In an important aspect of the present invention, a positive pressure is applied within the environment of the part being treated in order to improve the distribution of the medium on, throughout and into the component part being polished. This effect is further improved when the pressurized vapor is vented from the treatment vessel in order to enhance the flow of the vaporized treatment fluid over and through the component part.

These aspects and advantages of the present invention are brought about by a process which includes preheating the insoluble plastic component part to well below its softening or deformation temperature and contacting it with a vaporized fluid medium which is not a solvent for the inert or insoluble plastic material at the treatment temperature but which would be a solvent for the inert material at a temperature which would result in deformation of the plastic component part. More particularly, the preheated part and the vaporized fluid medium are brought into contact within a pressure vessel, and held therein while pressures are developed primarily through the action of the heated vapor as it expands through a phase change within a pressurized vessel. The pressure may be increased further and the fluid medium made more dense by mechanically applying a supplemental positive pressure to the vaporized fluid medium within the pressure chamber.

It is accordingly a general object of the present invention to treat the surface of insoluble plastics.

Another object of the present invention is an improved process for surface finishing plastic articles by an improved process using a fluid medium in which the plastic is insoluble at atmospheric pressure unless the plastic were to be raised to a temperature at which it would deform.

Another object of the present invention is an improved process for melting the surface of an insoluble or inert plastic component and then allowing the surface to reform from this molten state in order to produce a finish that is extremely smooth and free from minor surface variations such as machining marks, molding burrs, handling damage and defects which develop upon use.

Another object of the present invention is an improved process for surface finishing articles made of insoluble plastic by applying a slight positive pressure for increasing the density of the treatment fluid to thereby enhance the circulation thereof to all surfaces of the part.

Another object of this invention is a means for providing highly polished medical equipment components having surfaces to which access is difficult to obtain.

These and other objects of the present invention will be apparent from the following detailed description, taken in conjunction with the accompanying drawing.

In the drawing, the single FIGURE is a schematic view depicting the various processing steps for preparing component parts in accordance with this invention. For ease of understanding, the process of this invention will be described with reference to the FIGURE, which is not to be construed as limiting the scope or concept of the process.

A suitable treatment environment is provided by a structure such as a pressure chamber, designated generally at 11, which is a substantially gas-tight enclosure that will remain gas tight in opposition to vapor pressures developed therewithin. One or more plastic articles 12 are placed within the pressure chamber 11 for surface finishing thereof. The illustrated article 12 is in the nature of a small tubular T-shaped part having narrow internal, curved surfaces, and the particular article 12 shown is one used within a blood-processing system through which human blood flows, making it particularly critical to have extremely well-finished internal surfaces in order to prevent hemolysis. Articles of other shapes, most advantageously those having internal curves or other difficult to reach surfaces, which are molded or shaped of insoluble or inert polymers may be treated in accordance with the process of this invention.

Preferably associated with the pressure chamber 11 is a heat source, generally indicated by 13, typically of a construction including heating coils 14 and means, such as a thermostat 15, for measuring and controlling the heat generated by the heat source 13. Means for measuring the temperature at different locations within pressure chamber 11, on the order of the temperature gauges 16 and 17 illustrated, are of assistance in maintaining chamber locations at desired temperatures. A fluid medium enters the pressure chamber 11 through an inlet conduit or channel 18 which preferably directs the fluid medium generally toward the heat source 13, whereby the fluid medium will be vaporized after it leaves the channel 16 and upon entering the pressure chamber 11. This vaporized fluid medium will exert a vapor pressure within the pressure chamber 11 and thus upon the part 12 being treated therewithin, the development of this vapor pressure within the gas-tight pressure chamber causing the formation of a positive pressure therewithin to thereby provide an elevated treatment pressure in accordance with the process of this invention, which pressure may be measured by a pressure gauge 19.

The effectiveness of the elevated pressure is further enhanced by preheating the part 12 either by the heat source 13 or other heat source that is within the pressure chamber 11 or by a heat source remote from the pressure chamber 11. Such preheating should not raise the temperature of the part 12 to a temperature greater than that of the vaporized fluid. The preheated part 12 must be at a temperature slightly less than that of the vaporized fluid so that the fluid will condense on the surface of the part 12 in the presence of the particular positive pressure within the chamber 11. Preheating temperatures will vary with the material out of which the part 12 is made and the boiling and the detonation points of the particular fluid medium being used at the treatment pressure. As a general matter, the preheating temperature should be no less than about 3° C. lower than the treatment temperature of the fluid medium, the preheating temperature of necessity having to be lower than the treatment temperature of the vaporized fluid medium so the fluid medium will condense onto all of the surfaces of the preheated parts, even the internal surfaces.

In a preferred aspect of this invention, the fluid medium as a whole is subjected to an external pressure source such as the piston and cylinder depicted. This external pressure source 21 will inject the fluid medium into the chamber 11 for enhancing vaporization thereof and will also bring about an additional increase in the vapor pressure within the pressure chamber 11 in order to thereby generally increase the density of the vaporized fluid medium therewithin, although the magnitude of this effect is usually substantially less than the pressure increase caused by the phase change undergone by the fluid medium. Such increased density will enhance the ability and tendency of the vaporized fluid medium to flow to and into the part 12 being treated. Injection pressures typically developed by the external pressure source 21 will be up to about 15 psi (gauge), preferably between about 3½ and 5 psi.

After the part 12 has been subjected to treatment, with the vaporized fluid medium for from about 30 seconds to about 10 minutes, preferably from about 1 minute to about 5 minutes, the treated part 12 will be taken out of contact with the vaporized fluid by either removing the part from out of the chamber 11 or, as is preferred, by removing the vaporized fluid medium from the pressure chamber 11 through a vent to lower pressure or by means of a conduit 22 to an aspirator 23. Appropriate treatment times for each part 12 can be determined by viewing them through portholes 24,25 through the wall of chamber 11 in view of the fact that the smoothed part 12 will reflect light and give a glossy appearance.

Further improvement in the distribution of the pressurized and vaporized fluid medium throughout the part 12 can be realized by an optional feature of providing a siphon tube 26, shown in phantom in the drawing, between a portion of part 12 and the aspirator conduit 22 in order to supply a lower pressure for drawing the pressurized fluid medium into internal surfaces of the part 12. Even when part 12 is not directly connected to a lower pressure, circulation of the vaporized fluid medium will be enhanced somewhat by locating the part 12 between the outlet of channel 18 and the conduit 22 and by aspirating or otherwise providing a lower pressure outlet than that within the chamber 11 but not so low as to reduce the treatment time to below the time periods specified herein, with the result that a low velocity laminar flow of vaporized fluid medium through the pressure chamber 11 and more importantly through and around the part 12 being treated is developed.

Component parts to be treated by the process of this invention will be molded or otherwise shaped of inert plastic materials, typically high-strength polymers that are substantially insoluble in organic solvents at room temperature. More particularly, these insoluble or inert polymers are insoluble to the extent that the surfaces of parts made therefrom will be solubilized only when heated to a temperature at which the plastic part will deform. Such polymers will be particularly resistant to attack by unheated organic materials and strong acids and bases. These inert plastics will also be particularly suitable and advantageous for use in medical equipment, especially for parts thereof that remain in contact with body fluids which deteriorate plastics of the non-inert or soluble type. Preferred inert plastics include polymethylpentene, polypropylene, and the like, polymethylpentene being a polymer having particularly desirable properties for use in forming medical equipment component parts. Polymers of this type are especially difficult to polish because of their overall resistance to deterioration and their generally superior strength. Such generally inert polymers will have melting points on the order of 160° C. and up to about 250° C., preferably between about 190° C. and 230° C.

The fluid medium used in accordance with the process of this invention can be any one of a variety of compositions having solubilizing properties and that are liquid at room temperatures and will be vaporized in the positive pressure environment of the pressure chamber at a temperature well below the melting point of the material out of which the part being treated is made. Typical boiling point temperatures at standard pressure will be between about 25° C. and 100° C., preferably between about 35° C. and 80° C., at which temperatures the fluid medium chosen would not significantly solubilize the part being treated were it not at the elevated pressure provided in accordance with this invention. Suitable fluid media include carbon tetrachloride, methylene chloride, and trichloromethane (chloroform).

The following specific examples will more precisely illustrate the invention and teach the procedures presently preferred for practicing the same.

EXAMPLE I

Polymethylpentene tubular component parts for a human blood processing apparatus were preheated to approximately 76° C. and inserted into a pressure chamber having liquid carbon tetrachloride therein. The pressure chamber was sealed and heated until the internal temperature of the pressure chamber was above the boiling point of the carbon tetrachloride liquid medium at the positive pressure developed within the chamber until the surfaces of the component parts became soft and flowed, after which the parts were rapidly dried or flashed with dry air at a temperature of about 65° C. Observation showed the component parts to have polished and smoothed surfaces, including the internal surfaces of the tubular parts.

EXAMPLE II

Using an apparatus according to the FIGURE and omitting the siphon tube, a polymethylpentene medical equipment component was preheated to about 76° C. and inserted into the pressure chamber which was clamped shut. Carbon tetrachloride, about 2 to 3 cc, was injected by the external pressure source through the inlet conduit, at which time it was vaporized at the pressure chamber temperature, about 83° C. After allowing this treatment to proceed for about 2 minutes and 15 seconds, the pressurized, vaporized carbon tetrachloride was promptly removed by means of the aspirator. The pressure chamber was opened and the part was removed and hung within a hot, still-air oven to drive off any residual solvent and to prevent non-uniform, excessively fast drying of the residual solvent onto the part. The finished part had an excellently polished surface, and when tested within a blood processing system for 6 hours, no hemolysis was detected.

EXAMPLE III

The procedure of Example II was substantially repeated, except the component part treated, a tubular one, was directly vented out of the pressure chamber by means on the order of the siphon tube.

EXAMPLE IV

A component part made of polymethylpentene was placed within a pressure chamber and heated therein to a temperature of about 50° C. Trichloromethane was then added, after which the chamber was capped and pressure was developed until the part was observed to have a shine, followed by quick cooling by releasing the pressure. The thus finished part had acceptably smooth surfaces.

It will be apparent to those skilled in this art that the present invention can be embodied in various forms; accordingly, it is to be construed and limited only by the scope of the appended claims.

We claim:

1. A process for surface finishing inert, insoluble plastic component parts, comprising:
   selecting a component part made of an inert, insoluble plastic material, said plastic material being substantially insoluble in organic solvents including a selected fluid medium at room temperature and being soluble in organic solvents including said fluid medium at standard, substantially atmospheric pressure only when heated to a temperature at which the part will deform;
   preheating said component part to a selected temperature;
   placing said preheated component part within a substantially gas-tight environment;
   adding said selected fluid medium into said substantially gas-tight environment; said fluid medium being liquid at room temperature and being vaporizable within said environment at a treatment temperature below said temperature at which the component part will deform, and said selected fluid medium being a fluid in which the inert, insoluble plastic component is insolubilizable at room temperature and at all temperatures below said temperature at which the component part will deform;
   heating said added selected fluid medium to said treatment temperature while said environment is maintained gas-tight to vaporize said fluid medium and to develop a positive vapor pressure within said substantially gas-tight environment, said vapor pressure forming a treatment pressure within said substantially gas-tight environment that is greater than said standard, substantially atmospheric pressure, said treatment pressure being between about 3½ to 15 pounds per square inch (gauge);
   contacting the preheated component part, while at a temperature less than the treatment temperature, with said fluid medium at said greater than atmosphere treatment pressure to liquify the surfaces of said part while within said gas tight pressurized environment; and
   solidifying said liquified surfaces of said component part.

2. The process of claim 1, wherein said selected preheating temperature is no less than about 3° C. lower than said treatment temperature for effecting a condensing of said vaporized fluid medium onto all surfaces of said component part.

3. The process of claim 1, wherein said selecting step is one of selecting a medical equipment component part suitable for contacting body fluids and remaining inert with respect thereto when said contacting continues for several hours, said component part having narrow, internal curved surfaces.

4. The process of claim 1, wherein said fluid medium adding step injects said fluid medium at a pressure up to about 15 pounds per square inch.

5. The process of claim 1, wherein said liquifying step takes from about 30 seconds to about 10 minutes.

6. The process of claim 1, said liquifying step further comprising communicating an end of the component part with an atmosphere at a pressure less than said positive pressure developed within the pressurized environment.

7. The process of claim 1, said liquifying step further comprising venting said pressurized environment to an atmosphere at a pressure less than said positive pressure developed within the pressurized environment, while maintaining the time of said liquifying step to between about 30 seconds and about 10 minutes.

8. The process of claim 1, wherein said solidifying step includes rapidly removing said vaporized fluid medium from out of said pressurized environment.

9. The process of claim 1, wherein said solidifying step includes rapidly drying said component part with heated, dry air.

10. The process of claim 1, wherein said selecting step is one of selecting an inert polymer having a melting point between about 160° C. and about 250° C.

11. The process of claim 1, wherein said selecting step is one of selecting a component part made of a plastic material selected from the group consisting of polymethylpentene and polypropylene.

12. The process of claim 1, wherein said step of adding fluid medium adds fluid medium having a boiling point between about 25° C. and about 100° C., said fluid medium being a solvent of said insoluble plastic material at said boiling point and at said positive pressure, and said insoluble plastic material being insoluble in said fluid medium at room temperature.

* * * * *